Aug. 18, 1925.

S. CARLSON

PAN SCRAPING MACHINE

Filed Oct. 13, 1922.

1,550,426

Inventor:
Signe Carlson,
By Wm F Freudenreich
Atty

Patented Aug. 18, 1925.

1,550,426

UNITED STATES PATENT OFFICE.

SIGNE CARLSON, OF CHICAGO, ILLINOIS.

PAN-SCRAPING MACHINE.

Application filed October 13, 1922. Serial No. 594,241.

*To all whom it may concern:*

Be it known that I, SIGNE CARLSON, a citizen of the United States, residing at Chicago, county of Cook, State of Illinois, have invented a certain new and useful Improvement in Pan-Scraping Machines, and declare the following to be a full, clear, and exact description of the same, such as will enable others skilled in the art to which it pertains to make and use the same, reference being had to the accompanying drawing, which forms a part of this specification.

After a baked product is removed from a baking pan more or less of the baked product will be found adhering to the bottom and sides of the pan, and this residue must be removed before the pan can be used again. In bakeries where many such pans are used the pans are usually scraped, considerable time and labor being expended for this purpose.

The object of the present invention is to produce a simple and novel machine by means of which pans, particularly round pans, may be scraped very quickly and at the end of the scraping operation be much cleaner than when scraped by hand unless the greatest care were exercised in the hand operation.

Figure 1:
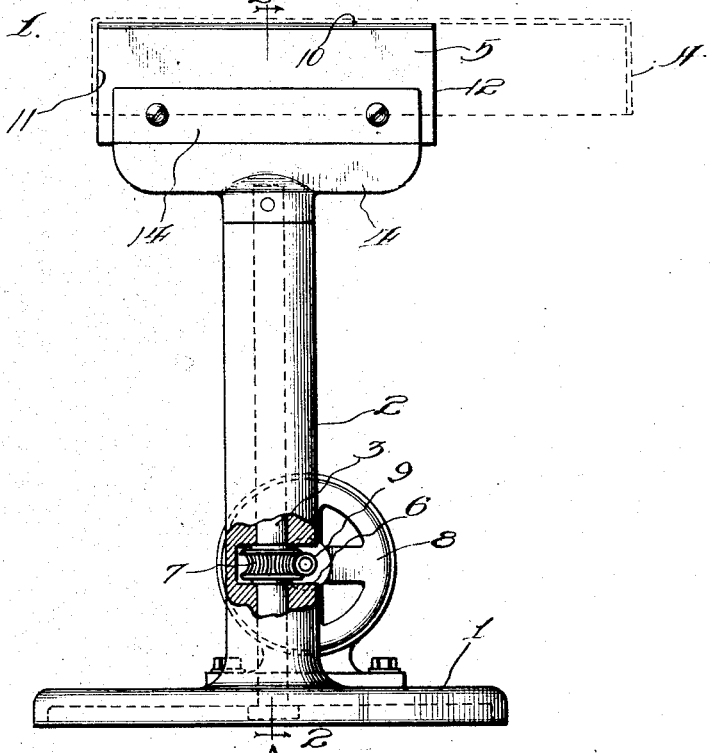
Figure 2:
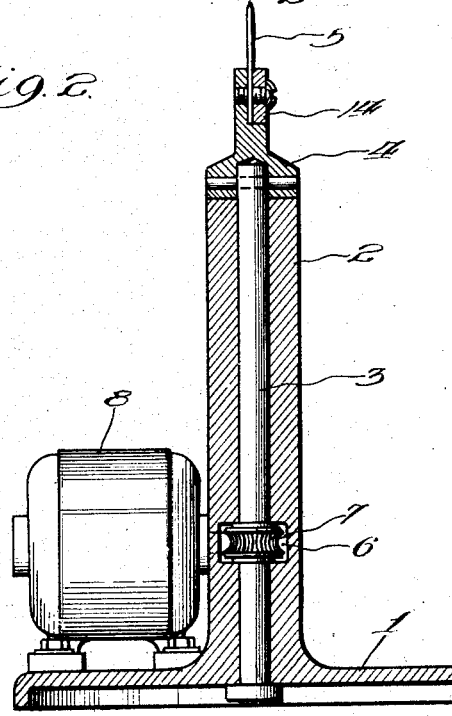

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is an elevation of a machine embodying my invention, a fragment of the pedestal being broken away, a pan which is being cleaned being shown on dotted lines; and Fig. 2 is a section taken approximately on line 2—2 of Fig. 1.

Referring to the drawing, 1 represents a base, from which rises a suitable standard or pedestal 2. Extending vertically through the pedestal is a shaft 3 carrying on the upper end a head 4 in which is clamped a suitable scraping blade 5. The pedestal has a transverse notch or slot cut into the same in the lower end, in which notch or slot is located a worm wheel 7 fixed to the shaft. On the base member is mounted a small electric motor, the shaft of which carries a worm 9 meshing with the worm wheel. Therefore, when the motor is set in operation, the shaft, and therefore the blade on the upper end thereof, is rotated, but at a much slower speed than the motor.

The blade shown in the drawing is designed for the purpose of scraping round pans, the sides of which are cylindrical; the blade being therefore made rectangular in cross section and having at the upper long edge a scraping edge 10 at right angles to the axis of rotation, and at the two ends scraping edges 11 and 12 parallel with the axis of rotation. A pan to be cleaned, such for example, as indicated in dotted lines at A in Fig. 1, is inverted over the blade so that the blade touches the bottom. Then, if the pan be held stationary while the blade revolves, that portion of the bottom of the pan with which the blade engages will be scraped clean. The blade is detachably held conveniently by employing a suitable clamping device 14 on the head or holder, and therefore the blade may be removed or replaced at will. If desired, the blade may be made just as long as the diameter of the pans to be cleaned, so that when a pan is placed over the blade the latter will clean not only the bottom, but through engagement with the side walls will also clean the sides. On the other hand, if it be desired to clean a pan whose diameter is greater than the length of the blade, it will be necessary to shift the pan transversely to the axis of rotation of the blade, so as to permit the three scraping edges of the blade, at one time or another, to come in contact with all of the surfaces to be cleaned.

It will thus be seen that I have produced a simple and novel machine whereby pans may be quickly and effectively cleaned by scraping, making it unnecessary to wash them or to wipe them with a cloth.

While I have illustrated and described with particularity only a single preferred form of my invention, I do not desire to be limited to the particular details thus illustrated and described, but intend to cover all forms of my invention coming within the terms employed in the definitions of my invention constituting the appended claim,

I claim:

A machine comprising a small portable base, a pedestal rising from the base, a vertical shaft rotatably supported in said pedestal, a single flat scraping blade detachably fixed directly to the upper end of the shaft and having an upper scraping edge extending transversely of the shaft beyond the upper end of the latter and vertical scraping edges at the ends, a motor on said base, and a driving connection between said motor and said shaft.

In testimony whereof I sign this application.

SIGNE CARLSON.